United States Patent

[11] 3,618,058

[72] Inventor Earl W. Springer
 Box 22, Fairland, Ind. 46126
[21] Appl. No. 23,579
[22] Filed Mar. 30, 1970
[23] Division of Ser. No. 739,406,
 June 24, 1968, Pat. No. 3,513,708
[45] Patented Nov. 2, 1971

[54] ALTITUDE-REPORTING ENCODER SYSTEM
 4 Claims, 4 Drawing Figs.
[52] U.S. Cl. .................................................. 340/204,
 73/384, 340/187, 340/190
[51] Int. Cl. ................................................. G08c 19/20
[50] Field of Search ........................................... 340/190,
 204, 187; 318/584, 602, 685; 73/384, 386, 387

[56] References Cited
UNITED STATES PATENTS
2,823,345 2/1958 Ragland et al. ............... 340/204 X
2,978,693 4/1961 Chapion ...................... 318/602 X
3,146,386 8/1964 Gerber ........................ 318/685 X Primary Examiner—Donald O. Woodiel
Attorney—Hood, Gust, Irish, Lundy & Coffey ABSTRACT: An altitude reporter comprising an altimeter, electro-optical means for tracking the position of the indicator of the altimeter, an encoder for registering the position of the indicator and providing pulse group series output corresponding to such a position, and means for operatively connecting the encoder to the electro-optical tracking means. This connecting means is effective, when the indicator moves in one direction, to operate the encoder to add increments of such movement and, when the indicator moves in the opposite direction, to operate the encoder to subtract like increments of movement. The encoder and the stepper motors which drive the encoder in response to electrical signals from the electro-optical means constitute a register.

PATENTED NOV 2 1971 3,618,058

INVENTOR.
EARL W. SPRINGER

BY Hood, Gust, Irish & Lundy
ATTORNEYS

ALTITUDE-REPORTING ENCODER SYSTEM

The present application is a divisional application based upon my prior copending application Ser. No. 739,406 filed June 24, 1968, now patent no. 3,513,708.

It is an object of my invention to provide an altitude indicating and reporting system which is extremely reliable and simple in construction, but yet which is satisfactory for the purpose intended. My system is arranged to take readings directly from a conventional aircraft altimeter in which pilots have great confidence and to present these readings in a form in which they can be transmitted via a conventional transponder to a ground station.

Many years of research and development and testing have produced the standard aircraft altimeter which utilizes the forces developed by barometric pressure changes to drive indicators or pointers. Of course, these forces are very small, and, consequently, the altimeter is a very delicate instrument. Heretofore, to my knowledge, no one has been able successfully to use the forces developed by the pressure-sensing means of an altimeter to drive electrical pickoff devices such as variable resistors. The problem is that any such pickoff device will present such a load to the pressure-sensing means that the output of the pressure-sensing means will be erratic. It is for these reasons that my system is arranged to take readings from a standard altimeter without, in any way, placing a load on the pressure-sensing means of the altimeter. In fact, in the preferred embodiment of my system, a standard altimeter, which is the only instrument technically and legally that can be used for air navigation, can be purchased and installed therein without, in any way, being modified. That is, my preferred system includes means for tracking the movement of the altimeter indicator through the glass cover plate of the altimeter.

My system may be used in connection with a transponder carried on an airplane and arranged to transmit the identity of the plane as well as other information, such as the altitude at which the plane is flying. With the advent of radar control of air traffic, a world wide system-utilizing pulse communication from such transponders is being placed in service. The success of this world wide system will depend, for the most part, on the capability of most, if not all, of the flying aircraft to transmit via a transponder the necessary information, including altitude. My system is so simple in construction that it will be economically feasible for small aircraft owners to purchase and install the system in their aircraft. It will be understood, however, that my system can be provided in forms which are sufficiently sophisticated to be used in very large and expensive and complicated aircraft systems. My system, in one or more embodiments, is ideally suited for use with the air data computer systems presently being proposed for use with large commercial aircraft.

My altitude indicating and reporting system will provide an output which is in the form of a digital code suitable for automatic altitude transmission via the authorized air traffic control radar beacon system. This code is published in REPORT No. 8893-SP-1, for FEDERAL AVIATION AUTHORITY CONTRACT FAA/BRD-329 Task No. 6. Further, my code complies with the International Civil Aviation Organization (ICAO) international agreements. My preferred system comprises an encoder which is driven to produce this digital code output which is suitable for transmission via a transponder to a ground station.

My system utilizes an encoder to provide the various pulse group series outputs representing 100 foot increments of altitude, the encoder including at least one disc having a plurality of concentrically arcuate contact strips formed thereon, a contact member arranged to engage each of the contact strips and means mounting the disc and the contact members for relative rotation. I prefer to use a pair of rotary stepping motors for producing such relative rotation, one motor being arranged to produce a predetermined amount of relative rotation in one direction for each 100 foot increase in altitude and the other motor being arranged to produce a like amount of relative rotation in the opposite direction for each 100 foot decrease in altitude. Thus, my encoder is driven in steps representing 100 foot increments in altitude. Since my encoder is driven in finite steps by such stepping motors, there will be no tendency for it to drift between the levels of altitude at which it is desired that an altitude report be made. That is, my encoder will produce a particular pulse group series steadily until it is stepped in one direction or the other to produce a different pulse group series. I prefer to use rotary stepping motors which produce relatively high output torques so that I can urge each contact member of the encoder against its associated contact strip with greater force which will, in effect, be a load which must be overcome by the stepping motors. However, this greater force of engagement between each contact member and contact strip provides a more reliable contact therebetween.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

In the drawings: FIG. 1 is a block diagram of my altitude indicating and reporting system;

Figure 1:
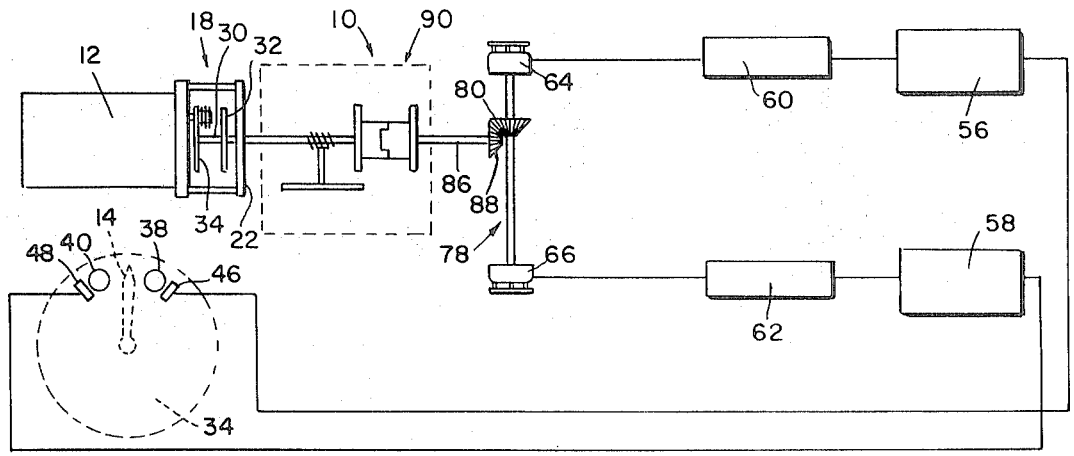

Referring now to FIG. 1, my system, indicated generally by the reference numeral 10, will be discussed. The system comprises a standard aircraft altimeter 12 which is equipped with an indicator or pointer 14 arranged for pivotal movement about an axis coinciding with the axis of the altimeter and means, indicated generally by the reference numeral 18, for tracking the movement of the indicator 14. As stated previously, the altimeter 12 may be a conventional altimeter which is normally found in the instrument panel of an aircraft. Such an altimeter has a glass cover plate covering and protecting the indicator 14 and the scale about which the indicator moves. My tracking means 18 is arranged to track the movement of the indicator 14 by projecting and reflecting light through this cover plate.

The tracking means 18 is mounted in front of the cover plate of the altimeter to be in alignment with the pivot axis of the indicator 14. In the illustrative embodiment, I mount a support plate 22 adjacent the front face of the altimeter, this support plate carrying a centrally located bearing defining a journal axis coinciding with the pivot axis of the indicator 14 and the axis of the altimeter 12.

The tracking means 18 comprises a shaft 30 journaled in the bearing of the support plate 22 and a slip-ring commutator 32 and another support plate 34 mounted on the shaft 30 for rotation therewith. The commutator 32 may be of conventional commutator construction arranged to provide electrical connections to rotating bodies.

I have provided a pair of light sources 38, 40 mounted on the support plate 34 to direct light through the cover plate of the altimeter toward the path of movement of the indicator 14. A light-responsive device 46, 48 is associated with each light source 38, 40, the light-responsive surface of each device facing the path of movement of the indicator 14. The devices 46, 48 are peripherally spaced apart on the side of the support plate 34 which faces the altimeter by an angle which represents a specific altitude increment. For reasons which are clearly explained in the parent application Ser. No. 739,406 from which this application has been divided, I prefer to make the peripheral spacing between the devices 46, 48 approximately 72° because altimeters are generally calibrated so that each 36° increment of movement of the indicator 14 corresponds to an altitude increment of 100 feet.

Each light-responsive device 46, 48 is arranged electrically to change state when the amount of light impinging thereon, i.e., impinging on its light-responsive surface, changes to a predetermined degree. Thus, since I project light at the path of movement of the indicator 14, when the indicator moves adjacent to one of the light-responsive devices 46, 48 the indicator will reflect light back toward the device to cause it to change state.

It is necessary, of course, to amplify the outputs of the light-responsive devices 46, 48 so that these outputs can be used by other electrical equipment. In FIG. 1, it will be seen that I have provided such amplifiers for amplifying the output of each light-responsive device 46, 48, these amplifiers being indicated by the reference numerals 56, 58. Each amplifier 56, 58 is coupled to and arranged to energize a silicon controlled switch 60, 62 (sometimes referred to as a silicon controlled rectifier) which is, in turn, connected to and arranged to energize a rotary stepping motor 64, 66. These rotary stepping motors 64, 66 comprise a drive means for the support plate 34 on which the light sources 38, 40 and the light- responsive devices 46, 48 are mounted as well as for my encoder. In FIG. 1, as a matter of convenience, I have shown the support plate 34 in solid lines adjacent the face of the altimeter 12 and, again, in dashed lines to illustrate the position of the devices 46, 48 thereon.

The amplifiers 56, 58 and the switches 60, 62 are fully described in the parent application from which this application is divided.

It will be appreciated that, when the indicator 14 moves close to the device 46 and reflects light thereon, the motor 64 will be energized to drive the support plate 34 on which the device 46 is mounted about the axis of the shaft 30. Thus, when the motor 64 is so energized, the device is moved away from the indicator and, consequently, the device stops producing a voltage. When this happens, gate current is withdrawn from the gate of the switch 60.

The motor 64 is arranged to drive the support plate 34 in a step-by-step manner in one direction about the axis of the shaft 30 and the motor 66 is arranged to drive the support plate 34 in a step-by-step manner in the opposite direction about the axis. Each motor 64, 66 is arranged so that, each time it is energized, it will drive the support plate 30 an amount equal to one-half the spacing between the devices 46, 48. Thus, once the indicator 14 is between the devices 46, 48, the support plate 34 will be driven, in a step-by-step manner to keep the devices 46, 48 on opposite sides of the indicator 14. As the indicator 14 approaches one of the devices 46, 48 and reflects light toward that device, the support plate 34 will be driven or jerked to move the device away from the indicator. I prefer that the motors 64, 66 be arranged to provide a very fast-action movement of the plate 34 as well as the discs of my encoder. For a description of the rotary stepping motors 64, 66, I refer to U.S. Pat. No. 2,496,880 issued Feb. 7, 1950 and U.S. Pat. No. 2,501,950 issued Mar. 28, 1950. I do not, however, intend to be limited to such motors because any number of types of solenoid devices can be arranged to provide a snap-action rotational movement.

Figure 2:
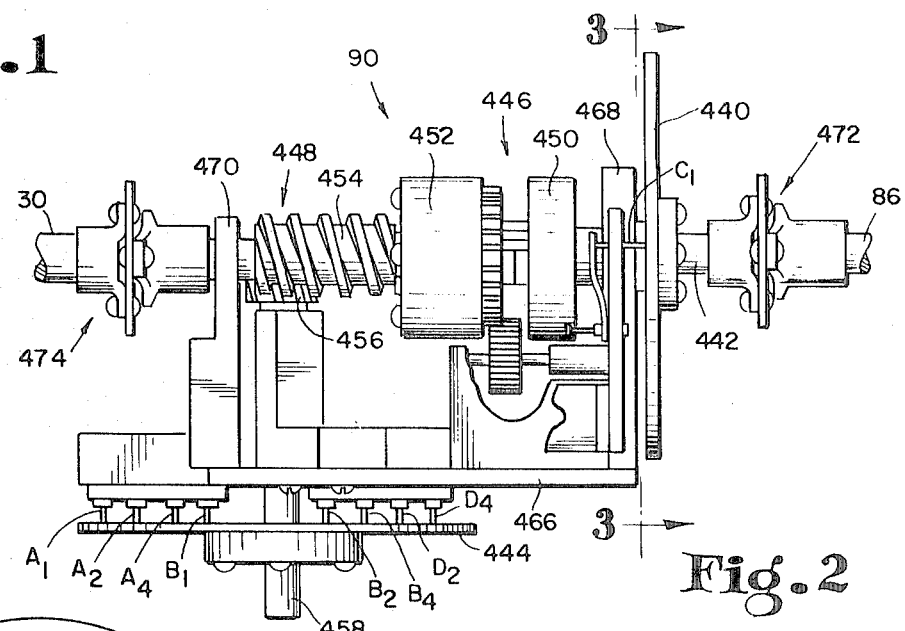
FIG. 2 is a fragmentary elevational view of my encoder.
Figure 3:
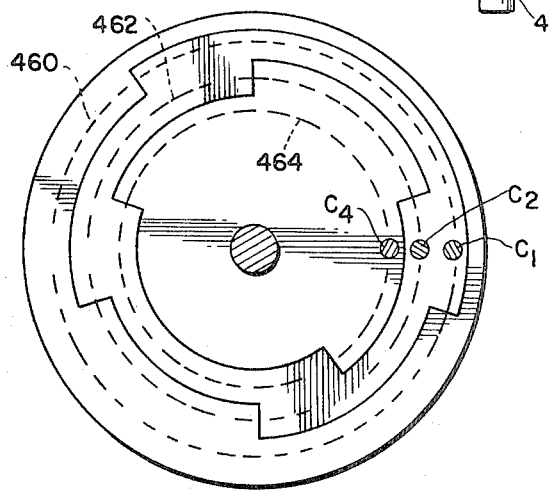
FIG. 3 is a sectional view taken from FIG. 2 generally along the line 3—3 and showing the contact strips on one of my encoder discs.
Figure 4:
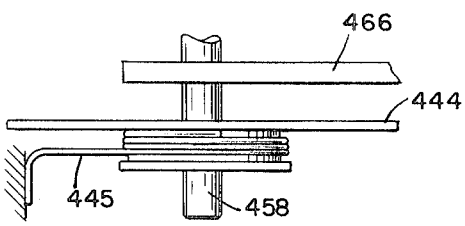
FIG. 4 is another fragmentary view showing spring means for biasing one disc of the encoder.

In the illustration of FIG. 1, I have arranged the motors 64, 66 to drive a common shaft means 78 which carries a bevel gear 80. The shaft 30 is drivingly connected to the shaft means 78 by means of a shaft 86 which carries a bevel gear 88 drivingly engaged with the bevel gear 80. The shaft 86 extends through my encoder assembly, indicated generally at 90, and constitutes an input shaft means for the encoder assembly. In FIG. 1, the encoder assembly 90 is shown as a box through which the shaft 86 extends. It will be appreciated that FIG. 1 is a diagrammatical view and that the details of my encoder are shown in FIGS. 2, 3 and 4. It will be appreciated, from FIG. 1, that my encoder 90, which provides the pulse group output of my system 10, is driven in a step-by-step manner by the same means which drives the support plate 34 to track the indicator 14.

The motors 64, 66 and the encoder 90, therefore, constitute a register for registering the position of the indicator 14 and providing a pulse group series output corresponding to such a position. The amplifiers 56, 58 and switches 60, 62, therefore, constitute means for connecting the electro-optical tracking means 18 to the register, i.e., to the motors 64, 66 of the register.

The encoder 90 of the system 10 will provide an output which can be communicated by a transponder from an aircraft to a ground station. That is, each time the support plate 34 is driven to track the indicator 14, the encoder 90 will be driven to provide a pulse group series output representing the new position of the plate 34 which, in effect, represents the position of the indicator 14. The encoder 90 is, therefore, driven in one direction by one of the motors 64, 66 to add increments of altitude and driven in the opposite direction by the other motor to subtract like increments of altitude. In this manner, the encoder 90 registers the position of the indicator 14. In the preferred embodiment, the encoder 90 will add 100 foot increments of altitude as the aircraft climbs and subtract like increments of altitude as the aircraft descends. Each 36° movement of the support plate 34 represents a 100 foot increment of altitude. It is for this reason that I refer to the encoder 90 as a register.

Referring now to FIGS. 2-4, it will be seen that my encoder 90 comprises a first encoder disc 440 which is mounted on a shaft 442 for rotation therewith, the shaft being connected directly to the previously discussed shaft 86. Thus, in my preferred embodiment, the disc 440 is driven in steps of 36° by the rotary stepping motors 64, 66 discussed previously. In the embodiment of FIGS. 1 and 2, the disc 440 will be driven directly with the support plate 34 on which the light-responsive devices 46, 48 are mounted with one complete revolution of the support plate 34 and the disc 440 representing an altitude change of 1,000 feet.

The encoder 90 further comprises an encoder disc 444 which is drivingly connected to the disc 440 by means of an intermittent motion transfer mechanism, indicated generally by the reference numeral 446, and a worm and worm gear means, indicated generally by the reference numeral 448. As illustrated in FIG. 4, I have found that it is desirable to use a spring 445 yieldably to resist rotation of the disc 444 by the mechanism 446 and means 448. This spring, which is arranged to permit more than one revolution of the disc 444 eliminates backlash problems involved in the mechanism 446 and means 448. The input 450 of the mechanism 446 is connected to the shaft 442 for rotation with the disc 440. The output 452 of the mechanism 446 is mounted for rotation relative to the shaft 442 and the mechanism preferably includes means for providing a 5 to 1 step reduction between the input 450 and the output 452. The worm 454 of the worm and worm gear means 448 is connected to the output 452 for rotation relative to the shaft 442. The worm gear 456 is mounted on the shaft 458 on which the disc 444 is mounted. In one preferred embodiment of my encoder 90, the worm and worm gear means 448 provides a 10 to 1 reduction.

Since the disc 440 is driven in steps, the output 452 will be driven one step each time the disc 440 is driven through five steps in one direction. The mechanism 446, which preferably is a conventional transfer mechanism used in counters, will drive the worm 454 in precise steps to drive the disc 444 in precise steps. Since there is a 10 to 1 reduction provided by the worm and worm gear means 448, one step of the disc 444 will be 3.6° which equals an increment of altitude of 500 feet. Thus, a full revolution of the disc 444 represents 50,000 feet of altitude.

The aforementioned REPORT No. 8893-SP-1, which specifies the altitude telemetric code which my encoder 90 must produce, calls for 9 pulse bits designated as $A_1$, $A_2$, $A_4$, $B_1$, $B_2$, $B_4$, $D_2$, $D_4$ all for 500 foot altitude increments and $C_1$ $C_2$ $C_4$ all for 100 foot increments of altitude. Thus, my encoder disc 440 provides three concentrically arcuate contact strips 460, 462, 464 (FIG. 3). In FIG. 3, I show a contact member $C_1$ $C_2$ $C_4$ arranged to engage each contact strip 460, 462, 464. Similarly, in FIG. 2, I have illustrated contact members corresponding to each of the pulse outputs $A_1$, $A_2$, $A_4$, $B_1$, $B_2$, $B_4$, $D_2$, $D_4$. While I have illustrated a contact member corresponding to each of the required pulse outputs, it will be understood that I have made no attempt, in FIGS. 2 and 3, to place these contact members in their proper positions relative to the discs 440, 444 with which they are associated. Further, it is within the capability of those skilled in the encoder arts to arrange contact members and contact strips so as to produce desired encoder outputs for given positions of the disc. For this particular application, the code output for any given 100 foot increment of altitude is defined in the ICAO agreements.

My encoder 90 is supported on a frame including the horizontally extending member 466 and the upright members 468, 470 through which the shaft 442 extends. I have illustrated conventional couplings 472, 474 for connecting the shafts 86, 30 to opposite ends of the shaft 442.

One advantage of my encoder 90 is that each of the discs 440, 444 is driven in finite steps by rotary stepping motors. Since, as discussed previously, these rotary stepping motors can provide a relatively high torque output, I can urge the contact members against their respective discs 440, 444 with sufficient force to assure good contact between each contact member and its respective contact strip.

In FIGS. 2 and 3, I have not illustrated the common ground contact member associated with each disc 440, 444.

What is claimed is:
1. Register means comprising an encoder having an input shaft, a first rotary stepping motor for driving said shaft in a step-by-step manner in one direction and a second rotary stepping motor for driving said shaft in a step-by-step manner in the opposite direction, a first disc connected to said shaft for rotation therewith, a plurality of concentrically arcuate first contact strips carried by said first disc and a stationary contact member engaging each of said first contact strips, a second disc, a plurality of concentrically arcuate second contact strips carried by said second disc and a stationary contact member engaging each of said second contact strips, and reducing means including an intermittent motion transfer mechanism providing a driving connection between said first and second discs.

2. The means of claim 1 in which said reducing means further includes a worm and mating worm gear, said worm being driven by the output of said transfer mechanism and said worm gear being drivingly connected to said second disc.

3. The means of claim 1 including spring means operatively connected to said second disc and effective yieldably to resist movement thereof by said reducing means.

4. The means of claim 2 including spring means operatively connected to said second disc and effective yieldably to resist movement thereof by said reducing means.

* * * * *